United States Patent

[11] 3,594,872

[72] Inventors Seymour J. Kulwin
 Evanston;
 James A. Swimmer, Des Plaines, both of, Ill.
[21] Appl. No. 810,134
[22] Filed Mar. 25, 1969
[45] Patented July 27, 1971
[73] Assignee Jeffrey-Allan Industries, Inc.

[54] VEHICLE SAFETY BELT BUCKLE
 13 Claims, 10 Drawing Figs.
[52] U.S. Cl. .................................................... 24/77,
 24/230
[51] Int. Cl. ........................................................ A44b 11/26
[50] Field of Search ........................................... 24/230.1

[56] References Cited
 UNITED STATES PATENTS
 3,181,215  5/1965  Eberhart ........................ 24/230.1 UX
 3,317,970  5/1967  Van Noord ..................... 24/230.1 UX
 3,364,531  1/1968  Moss .............................. 24/230.1 UX
 3,378,895  4/1968  Eberhart ........................ 24/230.1 UX
 3,449,800  6/1969  Fisher ............................ 24/230.1 UX FOREIGN PATENTS
 670,672  12/1929  France ........................... 24/230.1
 1,448,046  6/1966  France ........................... 24/230.1 UX Primary Examiner—Bernard A. Gelak
Attorney—Hofgren, Wegner, Allen, Stellman & McCord ABSTRACT: A pushbutton buckle for vehicle safety belts in which a base member has an upwardly biased latch member pivoted near its forward end, with the latch member being a second class lever that has an integral pushbutton at its rear end and intermediate rearwardly facing latch shoulders which engage holes in a slide link that is inserted through a transverse opening in the front of the base above the pivot. A fixed cover that makes a snap fit on the base has a hole through which the pushbutton is accessible.

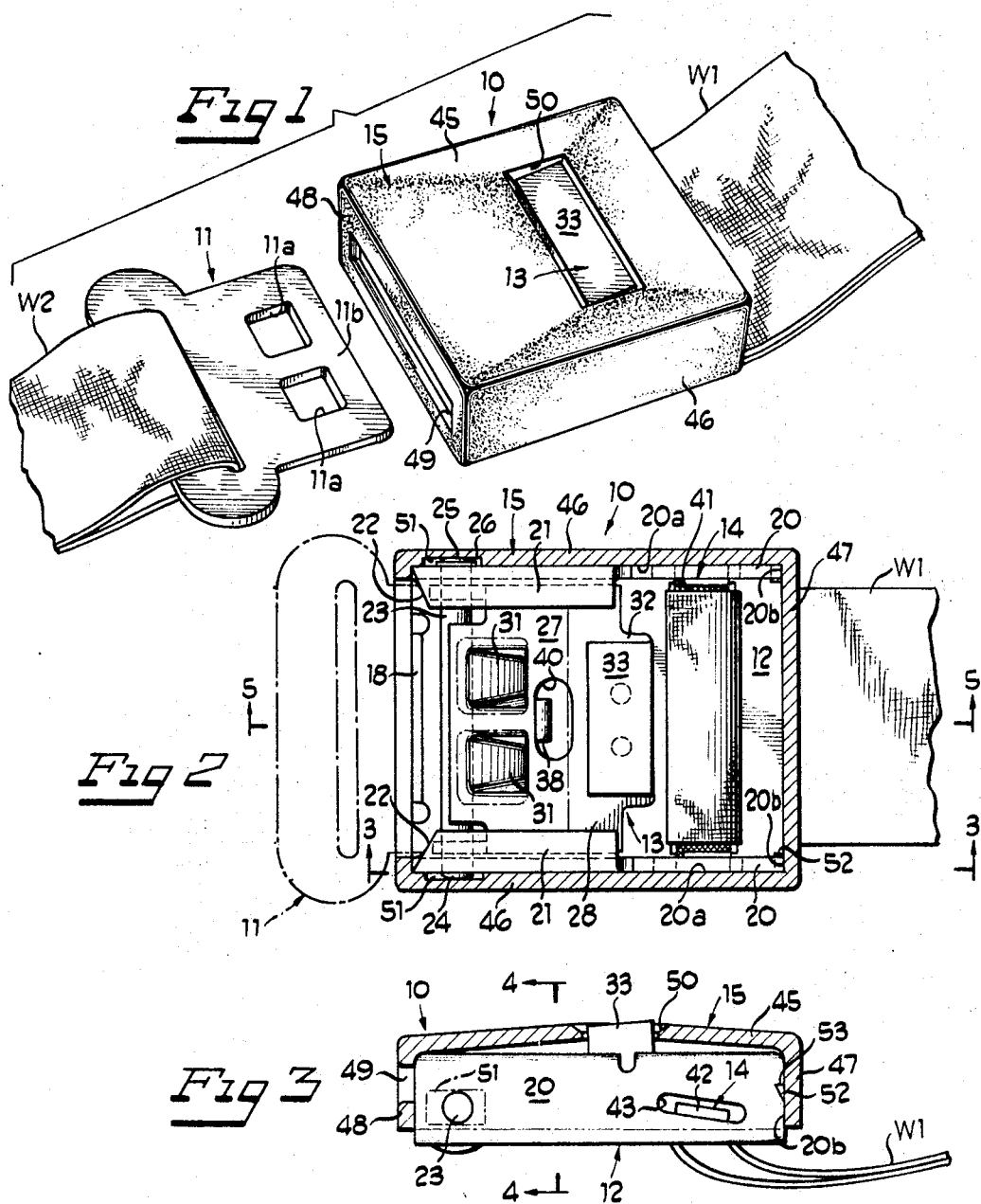

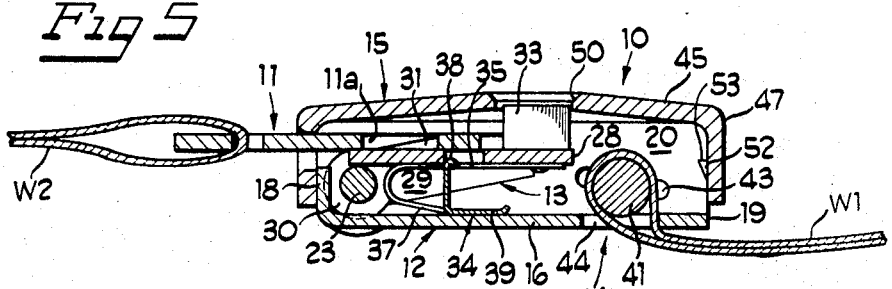
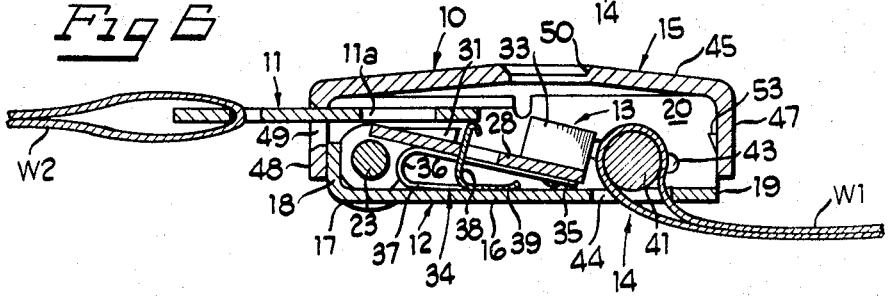
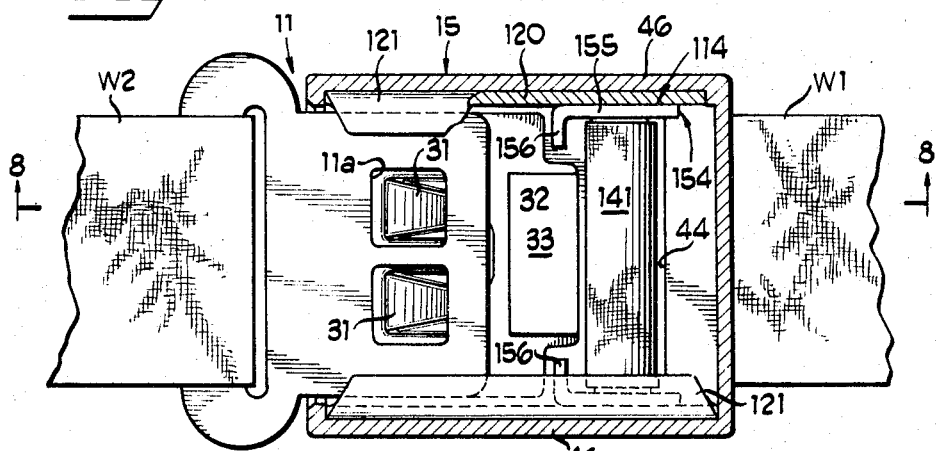
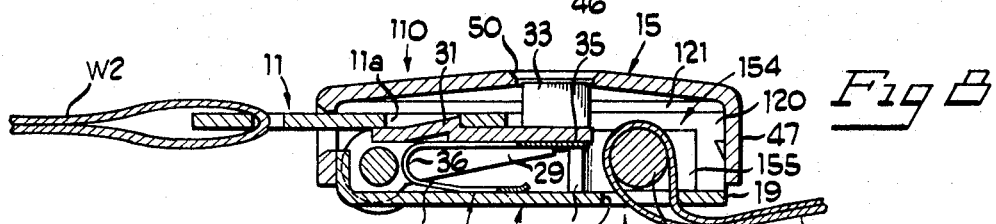
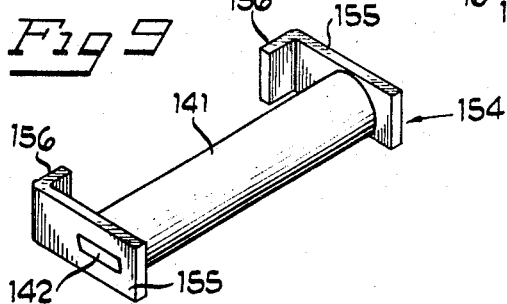
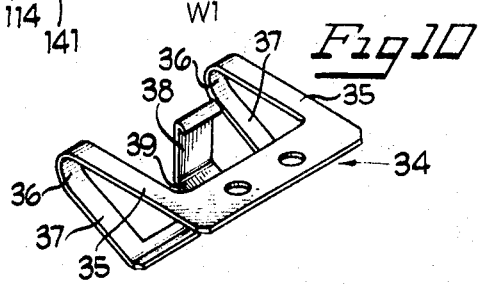

3,594,872

VEHICLE SAFETY BELT BUCKLE

BACKGROUND OF THE INVENTION

Vehicle safety belt buckles of the metal to metal type are used almost exclusively in automobile safety belts, and are coming into broader use on aircraft where they are beginning to replace the cam-type buckles in which the buckle clamps the webbing.

A relatively recent development in metal to metal safety belt buckles is the type in which a base is provided with a fixed cover, and disengagement of the slide link from the spring biased latch member of the buckle is accomplished by pressing down on a pushbutton which is accessible through a hole in the fixed cover. Such structures are generally easier to manipulate for unlatching than are the older-type buckles in which the latch member is disengaged by lifting a pivoted cover. This is particularly true if the person using the safety belt is wearing gloves. Pushbutton safety belt buckles of various types are disclosed in the following U.S. Pats.: Lehman No. 3,165,806, Murphy No. 3,203,064, Fisher et al. No. 3,331,108, Smith et al. No. 3,345,712, Foster et al. No. 3,349,445 and Silberschlag No. 3,355,781. Seat belt buckles of the older lever type are disclosed in patents including Varney et al. No. 2,458,810, Lathrop No. 2,846,745, Bishaf No. 2,896,284, Fisher No. 3,131,451, and many others.

The above identified pushbutton-type safety belt buckles may be divided generally into two categories. Fisher et al., Smith et al., Foster et al. and Silberschlag utilize lever systems to release the latch, and thus may be considered as reversals of the older lift lever type of mechanism. Such buckles are relatively complex mechanically, but have the advantage of permitting a very compact buckle structure.

Lehman and Murphy utilize a manual pushbutton which is integral with a part of the spring biased latch member, and thus are mechanically very simple but both structures must be relatively long and are clumsy for their intended purpose because the spring urged latch members are in the form of first class levers with the latch dog and the push button on opposite sides of the pivot for the latch member.

SUMMARY OF THE INVENTION

In accordance with the present invention, a seat belt buckle of the metal to metal type has a base member in the form of a plate provided with upturned sidewalls which are surmounted by inturned flanges, and an upturned lip at the front of the base cooperates with the front ends of the flanges to provide a transverse opening through which a slide link may be introduced into the buckle body. A latch member is mounted in the buckle body for pivotal movement on a pivot axis which is immediately to the rear of the upturned front lip, and a generally U-shaped spring which has a first arm riveted to the forward end portion of the latch member and a second arm bearing against the baseplate of the buckle body biases the latch member upwardly so that its lateral marginal portions bear on the inturned flanges of the body. A short distance to the rear of the pivot axis the latch member has a pair of upstanding rearwardly facing shoulders which engage holes in a slide link that is inserted into the buckle body through the transverse front opening.

The latch member has a short rearward extension to the rear of the latching shoulders, and an integral finger piece is mounted on the rearward extension. A cover member of resilient material makes a snap fit on the buckle body and has an opening directly above the finger piece on the latch member so that a person may disengage the latch member from the slide link merely by pressing manually on the finger piece to depress the rear of the latch member and disengage the shoulders from the holes in the slide link.

In order to keep the slide link from following the latch member downwardly when the latter is depressed, which would prevent disengagement of the latch shoulders from the slide link, the second arm of the U-shaped spring has an upwardly extending finger that extends through a hole in the latch member immediately to the rear of the shoulders and bears on the inner end of the slide link to hold the latter up.

In a preferred form of the invention, adjustment of the buckle on the safety belt webbing is provided by a standard cylindrical knurled bar which has its ends fixedly mounted in a pair of slide members that are mounted for fore-and-aft sliding movement between the sidewalls of the buckle body; and the slide members are permitted only limited up and down movement by the inturned flanges that surmount the sidewalls and are prevented from sliding out the rear of the buckle body by a downturned rear wall on the resilient cover member.

The primary object of the present invention, therefore, is to provide an improved buckle for vehicle safety belts.

Another object of the invention is to provide a pushbutton-type buckle which is of compact construction and yet possesses the extreme simplicity of a buckle which is disengaged by direct manual movement of the latch member.

Still another object of the invention is to provide a buckle for vehicle safety belts which is easily assembled from a very small number of components.

DESCRIPTION OF THE DRAWINGS

FIG. 1 is a perspective view of a safety belt buckle embodying the invention with the slide link in position to be inserted in the transverse front opening of the buckle body;

FIG. 2 is a plan view of a first embodiment of the structure with the top of the cover cut away to show the operating mechanism and with the slide link illustrated in broken lines in its position of engagement with the latch member;

FIG. 3 is a longitudinal sectional view taken substantially as illustrated along the line 3–3 of FIG. 2 and is, in effect, a side elevational view of the buckle body and a sectional view of the cover;

FIG. 4 is a transverse sectional view taken substantially as illustrated along the line 4–4 of FIG. 3;

FIG. 5 is a longitudinal sectional view taken substantially as illustrated along the line 5–5 of FIG. 2 showing the slide link engaged with the latch member;

FIG. 6 is a view like FIG. 5 with the latch member manually depressed to disengage the shoulders from the holes in the slide link, and with the slide link held up by the spring finger;

FIG. 7 is a view like FIG. 2 of a second and preferred embodiment of the invention having the improved web adjustment structure;

FIG. 8 is a section taken substantially as illustrated along the line 8–8 of FIG. 7;

FIG. 9 is a perspective view of the knurled adjusting bar and its slide members; and FIG. 10 is a perspective view of the latch spring.

DETAILED DESCRIPTION OF THE INVENTION

Referring to the drawings in greater detail, and referring first to FIGS. 1–6, the safety belt buckle structure of the present invention consists generally of a first buckle member 10 which is adjustably secured to a first length of webbing W1; and a second buckle member 11 in the form of a slide link which is secured to a second length of webbing W2.

As best seen in FIGS. 2–6, the first buckle member 10 includes a base member indicated generally at 12; a latch mechanism indicated generally at 13; adjusting means 14 for adjustably securing the first buckle member 10 to the length of webbing W1; and a cover member, indicated generally at 15.

The base member 12 includes a bottom plate 16 which has a front end 17 provided with an upturned lip 18, and a rear end 19. Integral upstanding sidewalls 20 extend from front to rear of the baseplate 16 and, in the form of the invention illustrated in FIGS. 1–6, the walls are surmounted by inturned flanges 21 which have front ends 22 that are adjacent the front lip 18 of the base member, and the flanges 21 terminate about half way to the rear end 19 of the baseplate.

The latch mechanism, indicated generally at 13, includes a transverse pin 23 which is mounted in holes in the sidewalls 20 immediately to the rear of the front lip 18, and the pin 23 has end portions 24 and 25 which project outwardly with respect to the outer faces 20a of the sidewalls 20. The projecting end portion 24 of the pin comprises a slightly enlarged head, while the projecting end portion 25 is provided with a circumferential groove (not shown) to receive a conventional split retainer 26.

The latch mechanism 13 also includes a latch member, indicated generally at 27, which has a body plate 28 and depending longitudinal webs 29 which have annular bosses 30 at their forward ends by means of which the latch member 27 is journaled on the pin 23 for pivotal movement. Surmounting the body plate 28 immediately to the rear of the annular bosses 30 is a pair of rearwardly facing latch shoulders 31, and to the rear of the latch shoulders the latch member has a rear extension portion 32 on which an upstanding finger piece 33 is fixedly mounted, as by riveting. The longitudinal marginal portions of the latch member 27 extend beneath the flanges 21 so that the flanges limit upward pivotal movement of the latch member.

Also a part of the latch mechanism 13 is a U-shaped spring, indicated generally at 34, the structure of which is best understood from FIG. 10. The spring 34 is generally U-shaped, and is bifurcated, so that it has a pair of laterally spaced first arms 35 which are riveted to the rear of the latch member 27, bight portions 36 which are immediately to the rear of the pin 23, and second arms 37 which bear on the base member 16. Accordingly, the spring 34 biases the latch member 27 upwardly against the flanges 21; so that when the slide link 11 is inserted in the first buckle member above the front lip 18 and below the flanges 21 it pivots the latch member 27 downwardly against the urging of spring 34 until a pair of holes 11a in the slide link pass over the rear ends of the rearwardly facing shoulders 31 on the latch member, at which time the latch member snaps upwardly to the position of FIG. 5 with the shoulders 31 engaged in the holes 11a of the slide link.

Disengagement of the latch member 27 from the slide link 11 is accomplished by pressing manually upon the finger piece 33 to depress the latch member 27 against the urging of the spring 34, and thus disengaging the latch shoulders 31 from the holes 11a in the slide link as illustrated in FIG. 6. In order to prevent the slide link from travelling downwardly with the latch member 27 as the latter is depressed, and thus preventing disengagement of the shoulders 31 from the holes 11a, supporting means for the slide link is provided in the form of an upstanding tongue 38 which is formed integrally with the U-shaped spring 34 and projects upwardly from a central web 39 of the spring. A hole 40 in the latch member body plate 28 which is between the shoulders 31 and the rearward extension 32 is impaled by the upstanding finger 38 so that the latter may bear against the rear or free end portion 11b of the slide link and thus support the latter when the latch member 27 is manually depressed.

In the structure of FIGS. 1—6, the adjusting means 14 for adjustably connecting the first buckle member 10 to the length of webbing W1 is entirely conventional, and consists of a knurled bar 41 at the ends of which are integral, flat mounting webs 42 that project through inclined slots 43 in the sidewalls 20. The length of webbing W1 is looped around the knurled bar 41 and has both of its ends carried downwardly through a transverse slot 44 in the rear portion of the baseplate 16. When the first and second buckle members 10 and 11 are engaged with one another as seen in FIG. 5, any force tending to separate the buckle members merely slides the knurled bar 41 rearwardly in the slots 43 and clamps the upper run of the webbing W1 against the rear of the slot 44. When it is desired to change the adjustment of the first buckle member 10 on the webbing W1, it is necessary only to tilt the forward end of the buckle member downwardly to free the upper run of the webbing W1 from the rear of the slot 44, whereupon the first buckle member may be moved on the length of webbing W1 by permitting the knurled bar 41 to run in the bight of the webbing. As previously stated, this is a wholly conventional adjusting means which has been used for many years in metal to metal safety belt buckles.

The cover member 15 of the first buckle member 10 is molded from a resilient, high impact thermoplastic material and includes a top wall 45 which spans the base member 12, a pair of depending sidewalls 46 on the top member 45 which slide over the outer faces of the upright sidewalls 20 of the base member 12, a rear wall 47 which extends transversely between the depending walls 46 and is positioned immediately behind the rear ends 20b of the upright walls 20 when the parts are assembled, and a front wall 48 having a transverse opening 49, the position of which is best seen in FIGS. 5 and 6 to coincide with the location of the transverse opening between the top edge of the front lip 18 of the base member and the inturned flanges 21 of the base member. The top wall 45 of the cover member 15 is provided with an opening 50 which is directly above the finger piece 33 so that the finger piece is manually accessible through the opening.

In order that the cover member 15 may make a snap fit on the base member 12, the depending sidewalls 46 of the cover member are provided near their forward ends and above their lower margins with recesses 51 that accommodate the projecting ends 24 and 25 of the cross pin 23 so that the sidewalls 46 of the resilient cover member 15 make a snap engagement beneath the projecting ends of the pin. The position of the recesses 51 is illustrated in FIG. 3 of the drawings in dot dash lines.

The transverse rear wall 47 of the cover member is provided with forwardly extending nibs 52 (FIGS. 3, 5 and 6) which make a snap engagement in complementary notches 53 in the rear ends 20b of the sidewalls 20. Accordingly, snap engagement of the cover member 15 with the base member 12 is easily accomplished during assembly of the parts; but in order to disengage the cover member 15 from the base member 12, it is necessary to insert a thin implement such as a screw driver blade between the base side walls 20 and the cover sidewalls 46, and it is also necessary to spring the rear wall 47 of the cover member outwardly to disengage the nibs 52 from the notches 53. Accordingly, the cover member 15 cannot be accidentally or inadvertently disconnected from the base member 12.

The embodiment of the invention illustrated in FIGS. 7, 8 and 9 is preferred, because of the simplified arrangement for assembling the web adjusting means in the base of the first buckle member. As seen in FIGS. 7 and 8, the second form of the invention is identical with the first except for the fact that a first buckle member 110 has a base, indicated generally at 112, the sidewalls 120 of which are surmounted by inturned flanges 121 which extend the entire length of the sidewalls 120 as shown by the lower flange 121 illustrated in FIG. 7 and the flange 121 illustrated in FIG. 8. Likewise, the inclined slots 43 are omitted from the rear end portions of the sidewalls 120. With the forgoing exceptions, the first buckle member and the second buckle member are identical with those of the first form of the invention, so except for the above discussed components of the second form of the invention which differ from those of the first form the same reference numerals are applied to the parts of FIGS. 7 and 8 as are applied to the parts of FIGS. 1—6.

The second form of the buckle member is provided with adjusting means, indicated generally at 114, for adjustably connecting the first buckle member 110 to the webbing W1. The structure 114 includes a standard cylindrical knurled bar 141 having flat tips 142 which are fixedly received in slide members, indicated generally at 154. Each slide member has a longitudinally extending slide portion 155 and a transverse stop portion 156 which extends laterally inwardly so as to flank the rear extension portion 32 of the latch member 27 and arrest forward movement of the slide members 154 by abutting the rear end of the latch member. The slide members 154 are best seen in FIG. 8 to be shallower than the distance from the bottom plate 16 of the base member 112 to the inturned flanges 129 of said base member, and to be shorter than the distance from the rear end 19 of the bottom plate 16 to the rear end of the latch member 27. Accordingly, the knurled bar 141 is free to slide fore-and-aft between the upstanding sidewalls 120 of the base and is also free to move up and down between the bottom plate 16 and the inturned flanges 121. The slide members 154 are held in the base 112 of the buckle member 110 by means of the transverse rear wall 47 of the cover member 15.

As seen in FIG. 8, the length of webbing W1 is wrapped around the knurled bar 141 and out through a slot 44 in the base plate just as in the conventional adjustment structure illustrated in FIGS. 1—6. Operation of the adjusting means 114 is also substantially like that of the conventional adjusting means inasmuch as tension on the lengths of webbing W1 and W2 tending to separate the slide link 11 from the latch member 27 causes the slide members 154 and knurled bar 141 to move rearwardly with respect to the buckle body and thus clamp the upper run of the webbing W1 against the rear of the slot 44. Adjustment of the first buckle member 110 on the webbing length W1 is accomplished as in the conventional structure by tilting the front end of the first buckle portion 110 downwardly so as to permit the slide members 154 to move forwardly and thus free the webbing from the rear edge of the slot 44.

The foregoing detailed description is given for clearness of understanding only and no unnecessary limitations should be understood therefrom as modifications will be obvious to those skilled in the art.

We claim:

1. A vehicle safety belt buckle comprising, in combination:
   a base member having a generally planar bottom plate with a front end and a rear end, and upstanding sidewalls;
   a cover member which has a top wall spanning the base member and downturned peripheral flange means engaging the upstanding sidewalls, there being an opening in said top wall a substantial distance to the rear of the front end of the base member;
   transverse flange means at the front end of the base wall; which define a shallow transverse opening intermediate the bottom plate and the top wall;
   a latch member mounted for pivotal movement about a transverse axis which is adjacent the front end of the base member and spaced above the bottom plate and below the transverse opening, said latch member comprising a planar plate which has rearwardly facing upstanding latch shoulder means and which has a rear extension portion which is entirely to the rear of said shoulder means and beneath the opening in the top wall;
   latch spring means biasing the latch member upwardly about its pivot axis;
   stop means which is contacted by a rearward part of the latch member to limit upward pivotal movement of the latch member and normally orient it in a position which is slightly inclined upwardly from front to rear and with the top surfaces of the planar plate aligned with the transverse opening;
   an upstanding finger piece on the rear extension portion of the latch member for manually depressing the latter through the opening in the cover member;
   a slide link comprising a planar plate insertable through the transverse opening for releasable engagement with the shoulder means on the latch member, said slide link when engaged with the shoulder means having its free end slightly forward of the finger piece and being in a plane which is generally parallel to the bottom plate with the bottom surface of the slide link in extensive facing engagement with the top surface of the latch member planar plate and held against the stop means by the latch member;
   means engageable with the underside of the slide link to support the latter when the latch member is manually depressed;
   and means at the rear of the base member to receive safety belt webbing.

2. The buckle of claim 1 in which the latch spring means is a U-shaped spring having a first arm secured to the latch member and a second arm against the bottom plate.

3. The buckle of claim 2 in which the latch member has a hole between the latch shoulders and the finger piece, and in which the second arm of the spring includes an upstanding finger projecting through said hole and bearing on the slide link to furnish the support means for the latter.

4. The buckle of claim 3 in which the first arm of the latch spring is secured beneath the finger piece and the spring has a bight portion just to the rear of the pivot means.

5. The buckle of claim 2 in which the first arm of the latch spring is secured beneath the spring finger piece and the spring has a bight portion just to the rear of the pivot means.

6. The buckle of claim 1 in which the means to receive safety belt webbing includes a cross bar about which the webbing is passed, and a pair of slide members fixedly secured on the ends of the crossbar which are guided between the sidewalls and beneath the cover member, and in which the buckle includes a rear wall behind the slide members.

7. The buckle of claim 1 in which the transverse axis for the latch member comprises a pin the end portions of which project through holes in the sidewalls of the base member, and in which the cover member has resilient sidewalls flanking the sidewalls of the base member and making a snap engagement beneath said projecting end portions.

8. The buckle of claim 7 in which the cover member has a resilient rear wall, and said rear wall has forwardly projecting integral nibs which engage notches in the rear ends of the sidewalls of the base member.

9. The buckle of claim 1 in which the cover member is resilient and has a rear wall, and in which said rear wall has forwardly projecting integral nibs which engage notches in the rear ends of the sidewalls of the base member.

10. In a vehicle safety belt buckle, in combination:
    a first buckle member having a baseplate with upstanding sidewalls;
    a transverse pin mounted in said upstanding sidewalls adjacent one end thereof, said pin having end portions which project laterally a short distance beyond the outer surfaces of the sidewalls;
    latch means pivotally mounted on said pin;
    spring means urging said latch means in latching direction;
    a second buckle member releasably engageable with said latch means;
    means for the manually disengaging the latch means from said second buckle member; and
    cover means of resilient material which has a top plate with depending sidewalls on said top plate, said cover means spanning the upstanding sidewalls of the first buckle member, ans said depending sidewalls having internal recesses in spaced relationship to their lower margins, said recesses receiving the projecting ends of the pin to provide a snap engagement between the first buckle member and the cover member.

11. The buckle of claim 10 in which the cover means has a transverse rear wall the inner face of which abuts the rear ends of the upstanding sidewalls on the first buckle member, and in which said rear wall and said rear ends of said upstanding sidewalls have interengaging means by which the rear wall makes a snap engagement with the upstanding sidewalls.

12. The buckle of claim 11 in which the interengaging means comprises forwardly projecting integral nibs on the rear wall and notches in the rear ends of the upstanding sidewalls.

13. The buckle of claim 1 in which the stop means are inturned flanges on the sidewalls which are parallel to the bottom plate and extend from adjacent the front to a point behind the free end of the slide link, so that the entire marginal portions of the slide link are in facing engagement with the flanges.